United States Patent
Schneider et al.

(10) Patent No.: US 6,519,396 B2
(45) Date of Patent: Feb. 11, 2003

(54) AERIAL CABLE CONTAINING OPTICAL TRANSMISSION ELEMENTS AND PROCESS FOR THE MANUFACTURE OF AN AERIAL CABLE

(75) Inventors: Reiner Schneider, Ebersdorf (DE); Waldemar Stöcklein, Coburg (DE)

(73) Assignee: CCS Technology, Inc., Wilmington, DE (US)

(*) Notice: Subject to any disclaimer, the term of this patent is extended or adjusted under 35 U.S.C. 154(b) by 0 days.

(21) Appl. No.: 09/877,722

(22) Filed: Jun. 8, 2001

(65) Prior Publication Data
US 2002/0041743 A1 Apr. 11, 2002

(30) Foreign Application Priority Data
Jun. 9, 2000 (DE) .......................... 100 28 562

(51) Int. Cl.[7] ................................. G02B 6/44
(52) U.S. Cl. .................. 385/101; 385/147; 174/70 R
(58) Field of Search .................. 385/100–114, 147; 174/70 R, 106 D

(56) References Cited

U.S. PATENT DOCUMENTS

| | | | |
|---|---|---|---|
| 4,557,560 A | * 12/1985 | Bohannon et al. | 174/106 D |
| 4,673,247 A | * 6/1987 | Oestreich | 174/70 R |
| 4,776,665 A | 10/1988 | Oestreich | |
| 5,360,497 A | 11/1994 | Schneider et al. | |
| 5,563,976 A | 10/1996 | Rowland | |
| 5,932,149 A | 8/1999 | Schneider | |

FOREIGN PATENT DOCUMENTS

| | | |
|---|---|---|
| DD | 110905 A | 1/1975 |
| DD | 153616 A | 1/1982 |
| DE | 31 13 528 A | 10/1982 |
| DE | 35 04 041 A | 1/1986 |
| DE | 36 18 659 A | 12/1987 |
| DE | 41 42 047 A1 | 6/1993 |
| DE | 195 46 773 A1 | 8/1996 |
| DE | 196 05 276 A1 | 8/1997 |
| EP | 0 214 480 A | 3/1987 |
| EP | 0 403 285 A2 | 12/1990 |
| EP | 0 695 431 B1 | 2/1996 |
| WO | WO 99/04300 | 1/1999 |

OTHER PUBLICATIONS

Type: Loose Tube Cables, http://www.winglobe.com/sternate/ALLDIE.HTM, Mar. 13, 1998.

IPT Top Cable: Optical Fibre Cable, http://www.ipt.at/homepage.html, vom Mar. 13, 1998.

PLP & Services: Fiberlign Motion Control, Products for OPGW & ADSS, hhttp://www.performed.com/PROD/motion.html#anchok, r102644S, Mar. 13, 1998.

G. Mahlke and P. Goessing, *Lichtwellenleiterkabel*, Publicis MCD Verlag, 5th edition, pp. 157–162 (1998).

* cited by examiner

*Primary Examiner*—Akm E. Ullah

(57) ABSTRACT

In addition to the mechanical stresses caused by wind, icing, etc., the manufacturer of an optical aerial cable has to consider the electrical stress mechanisms (corona discharge, "tracking" effect) which lead to premature aging of the outer jacket by considering constructive measures and the use of special jacket materials. The outer jacket of the aerial cable contains several PE fusible fibers embedded into the jacketing material, whose conductivity is based on the content of carbon black in the amount of 10% of weight to 40% of weight. The resistance of these fusible fibers manufactured by coextrusion with the outer jacket is sufficiently low at $10^5$ $\Omega/m$–$10^9$ $\Omega/m$, to discharge the induced electrical charges to the anchoring spirals fastened to the pole. No large potential differences in the longitudinal direction of the cable can occur on the wet, only partially dried jacket surface.

28 Claims, 2 Drawing Sheets

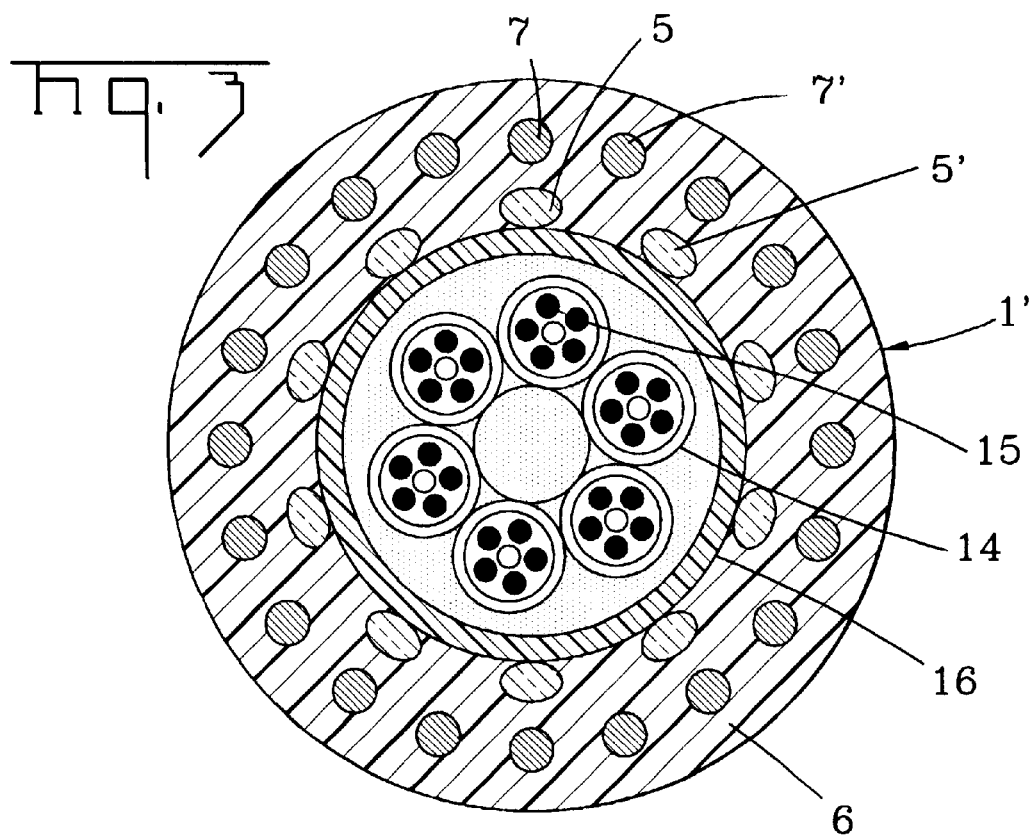
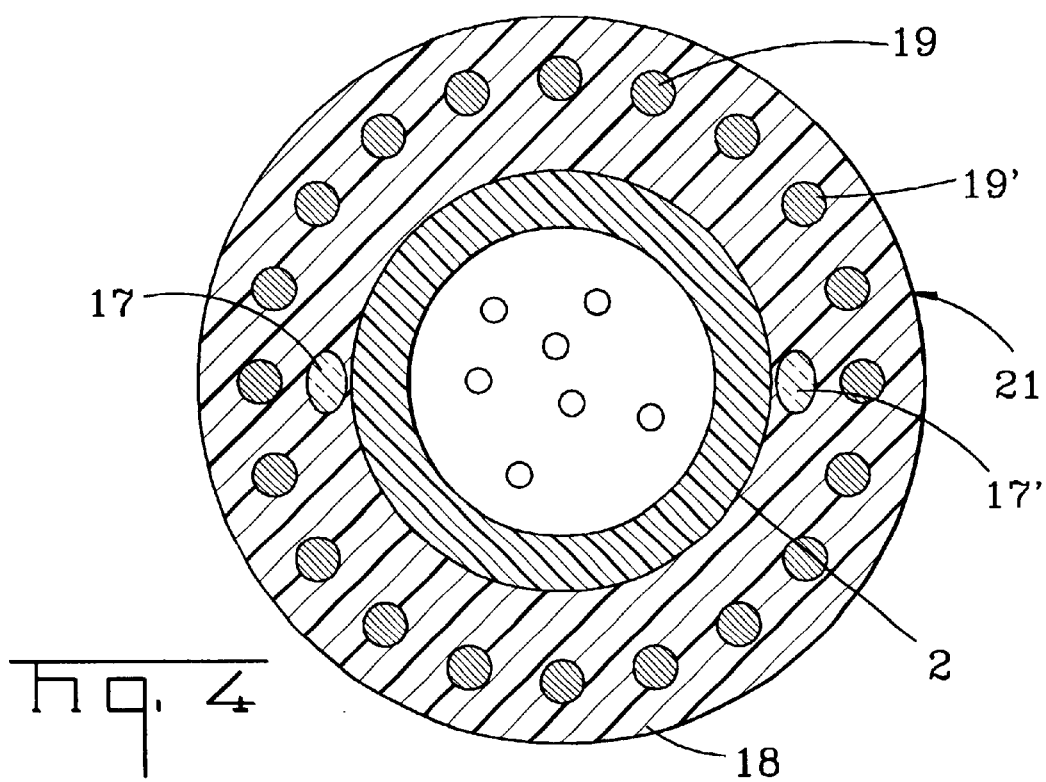

AERIAL CABLE CONTAINING OPTICAL TRANSMISSION ELEMENTS AND PROCESS FOR THE MANUFACTURE OF AN AERIAL CABLE

BACKGROUND OF THE INVENTION

The installation of optical fiber aerial cables in their medium and high voltage paths makes it possible to connect communications of power supply plants, all metropolitan centers of a region as well as their larger cities and communities while circumventing the networks of governmental and/or private telecommunications companies.

For this purpose, self-supporting, i.e., self-terminating aerial cables and so-called ADL cables (All-Dielectric Lash) are mainly used. While self-supporting aerial cables are provided with non-metallic tension relief elements (All-Dielectric-Self-Supporting or ADSS cable) or with a messenger wire (Figure-8-cable) which absorbs the tensile forces, the ADL cables have no supporting elements. Normally they are fastened to an already installed ground or phase wire of the high voltage line by means of a glue or lashing strip. An overview concerning optical aerial cables can be found in "Lichtwellenleiterkabel" by G. Mahlke, P. Goessing, Publicis MCD Verlag, $5^{th}$ edition, pp. 157–162 (1998).

As ground and phase wires, the ADSS cable stretched between the poles of a high voltage line, is subject to considerable mechanical stresses due to wind, icing, or large temperature variations. Besides the necessary tensile strength, the cable manufacturer has to consider the electrical stress mechanisms which lead to accelerated aging and finally to damage or destruction of the cable jacket, especially corona discharge in the area of the anchoring spirals and the so-called tracking effect (dry-band-arcing), by using appropriate measures and special jacketing materials.

To suppress these effects the following suggestions are made:
- to manufacture the jacket of the aerial cable from a plastic which is self-quenching and stable against partial discharge and non-tracking or supply it with a tracking resistant outer layer (see U.S. Pat. No. 4,673,247 and WO 99/04300),
- to soak the aramid yarns serving as tension-proof elements with a low conducting liquid (see U.S. Pat. No. 4,776,665), and
- to arrange electrical conductor elements, not connected to each other and partially overlapping in the axial direction, between the cable core and the outer jacket (see EP 0 695 431 B1).

In U.S. Pat. No. 5,563,976 it is suggested, to divert the charges induced by capacitive charging of the ADSS cable to the pole by means of several carbon containing fiber strands which surround the cable core in a spiral or helix fashion. The fiber strands with a carbon content of between 65% and 92% of weight, are produced by pyrolysis of polyacrylonnitrile. Additionally, the distribution of the fiber strands influencing the voltage path along the cable cannot sufficiently be adjusted to the given conditions or standards.

SUMMARY OF THE INVENTION

The objective of the invention is an aerial cable with multiple uses, especially a dielectric optical communications cable capable of being installed in the field of a high voltage line, whose jacket has high longevity. Additionally the manufacture of the cable should be simple, variable and cost effective.

These requirements are met by an aerial cable which contains: at least one optical transmission element surrounded by a protective covering, at least one tension-proof element, an outer jacket and several strand- or string-like elements completely embedded into the jacket material, where the strand- or string-like elements consist of a polymer with semiconductor characteristics or of a polymer mixture with semiconductor characteristics and where the resistance of the polymers or the polymer mixture are in the range of $10^5$ $\Omega$/m and $10^9$ $\Omega$/m.

The dependent patent claims concern preferred constructions and further development of the aerial cable. A process for the manufacture of such a cable provides for a cable core with at least one optical transmission element and an outer jacket where several fusible strands or fibers made from a polymer having semiconductor characteristics or a polymer mixture having semiconductor characteristics produced by means of coextrusion are embedded into the fusible jacket material.

In an aerial cable constructed according to the invention, the induced electrical charges are discharged by means of semiconductor fusible fibers completely embedded within the PE jacket to the grounded anchoring spiral fastened to the pole. Even on the jacket surface, which is still wet and only partially dried off, no large potential differences in the longitudinal direction of the cable can occur. Additionally, the fusible fibers can be embedded into the jacket material in a simple manner, in the desired numbers, with the required thickness and with nominal radial distance to the longitudinal axis of the cable, running exactly parallel to the longitudinal axis of the cable. This last factor contributes to the homogenization of the field strength distribution along the cable.

BRIEF DESCRIPTION OF THE DRAWINGS

Figure 1:
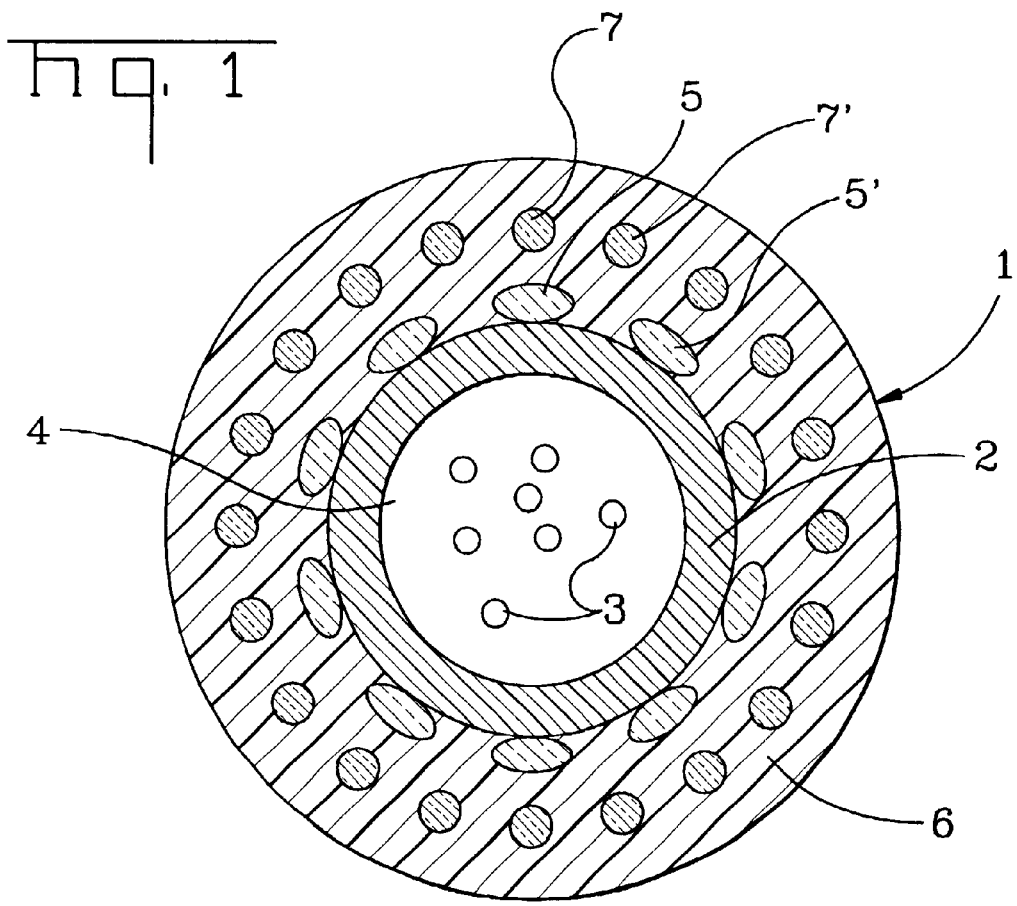
Figure 2:
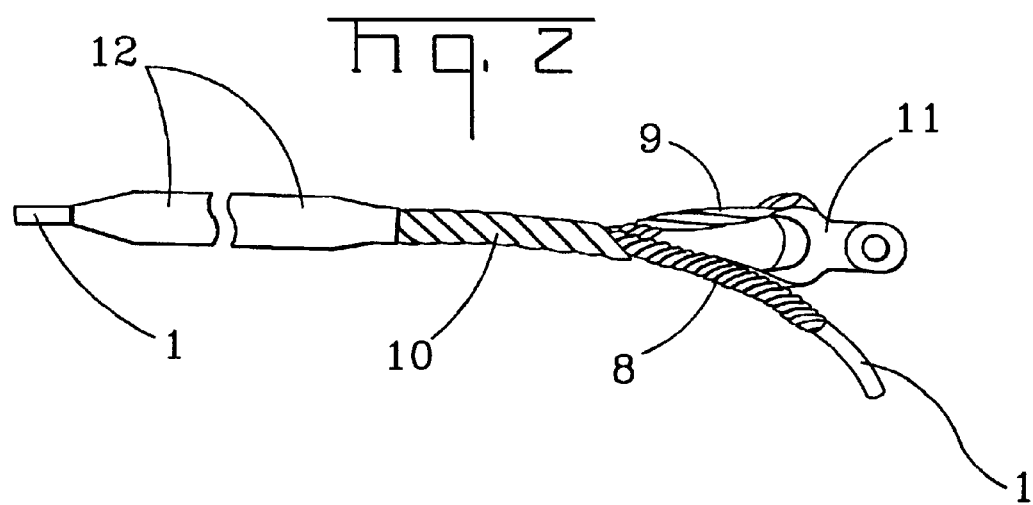

Having thus described the invention in general terms, reference will now be made to the accompanying drawings, which are not necessarily drawn to scale, and wherein:

FIG. 1 is a cross-section of an aerial cable constructed according to the invention, FIG. 2 is a device for anchoring the ADSS aerial cable at the pole of an high voltage line, FIG. 3 is a cross-section of a second construction sample of an ADSS aerial cable, and FIG. 4 is a cross-section of an ADL cable according to the invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The basic element of the self-supporting dielectric aerial cable 1 (ADSS cable) shown in FIG. 1 not according to scale, is the centrally located maxi-bundle core 2 (outer diameter $\varnothing$=6 mm), whose jacket, serving as the protective covering for the 12–48 optical fibers 3 (LWL), is made from a comparatively hard plastic which can be extruded. Polyamide (PA), Polypropylene (PP) and Polybutylentheraphthate (PBTP) are especially suitable as jacketing material. If a dual layer protective covering is used, the inner layer can be made of polycarbonate (PC), the outer layer extruded onto it can be made of PBTP.

The optical fibers 3, perhaps stranded together and consisting of a glass core (refractive index $n_k$) a glass jacket ("cladding"; refractive index $n_c < n_k$) and an outer, usually colored lacquer ("coating", refractive index $n_{coa} > n_k$) are arranged with excess length (=5%) in the tube-like protective covering of the maxibundle core 2, and therefore not or only minimally subjected to tensile forces in the anchored ADSS cable 1. A chemically neutral thixotropic substance 4, which is not dripping or freezing in the temperature range between −40° C. and +70° C., prevents water from penetrating into the bundle core 2 and permeating in the direction of the longitudinal cable axis.

The tensile forces affecting the ADSS cable are absorbed by elements 5, 5' which are bundles of aramid yarns or fibers (Kevlar), which are arranged symmetrically in relation to the longitudinal cable axis and are elliptical or circular. In order to maintain their flexibility or bending capacity, the cable manufacturer has to ensure that the aramid yarns or fibers and the jacket material extruded onto them do not bake together. In place of aramid yarns, other tensile-proof materials, especially glass fibers (rovings) or ultra high molecular polyolefin fibers (trade name "Dynema") may be used.

The cable includes an outer jacket 6 that is generally formed of a polyolefin or copolymers of several olefins, such as high density polyethylene (HDPE), medium density polyethylene (MDPE), low density polyethylene (LDPE), low linear density polyethylene (LLDPE) or ethylene-vinyl acetate (EVA). For example, the outer jacket 6 of the aerial cable 1 with a thickness of 1.7 mm consists of polyethylene (PE), especially LMDPE (Linear-Medium-Density-PE) produced in a special low pressure process by means of catalytic agents. The highly stressed PE, subjected to weather and intensive sun rays, contains the usual additives such as carbon black, anti-oxidants, degradation inhibitors, pigments, etc., in amounts necessary for each application (see, for example, WO 99/04300).

In order to discharge the charges induced by the electric field of the phase wires over the anchoring spiral fastened to the pole (FIG. 2), the outer jacket 6 contains several fusible fibers, arranged parallel and symmetrical relative to the longitudinal cable axis due to manufacturing reasons, whose resistance is in the range of $10^5$ Ω/m and $10^9$ Ω/m. The conductivity of the fusible fibers 7, 7' made of a polymer or a polymer mixture (compound) is essentially based on the content of carbon or carbon black, respectively; the content of this in the polymer matrix is from 10% to 40% of weight. An especially close and therefore durable connection between the jacket material PE and the totally embedded fusible fibers, in this sample N=20, each with a thickness of 0.1 mm, is achieved when the fusible fibers 7, 7' are also made of PE, or of PE being the main component with approx. 50–90% of weight of the polymer compound. By adding 0.1.% of weight of polyorganosiloxane ("silicone") the temperature stability of the fusible fibers 7, 7' can be improved. Additionally, the polymer or polymer compound can contain an antioxidant (for example, Irganox 1010) of 0.1–0.2% of weight. The cable can include a number N of fibers with N=1 to 100 typically and N=2–50 preferably. The diameter of the fibers can also vary, such as from 0.01 mm to 1 mm, with 0.1 mm typical.

The embedding of the fusible fibers 7, 7', of N=20–100, and with a thickness of approx. 0.1 mm, into the still liquid or tacky jacket material is done by coextrusion technology using extruder heads described in U.S. Pat. No. 5,932,149 or U.S. Pat. No. 5,360,497. The fusible fibers are completely embedded within the jacket and, in one embodiment, are arranged radially in the center of the jacket. The number of fusible fibers to be produced and their cross-section area are measured in such a way, that a secure discharge of the induced charges, i.e., a high conductivity, is guaranteed, but the outer jacket 6 still has a high resistance of, for example, $10^{12}$ Ω/m in the longitudinal direction of the cable.

Table 1 shows several additional construction characteristics and mechanical data of the ADSS cable 1.

TABLE 1

| (ADSS Cable) | |
|---|---|
| Cross-section area of the aramid yarn | 7.2–36 mm$^2$ |
| Outer diameter | 9.6–13.9 mm |
| Thermal elongation coefficient | −2 × 10$^{-6}$/K |
| Modulus of elasticity | 120 kN/mm$^2$ |
| Calculated tensile strength | 17–66 kN |
| Cable weight | 70–190 kg/km |
| Max. tensile load | 3500–24000 N |
| Max. bending radius | 145–210 mm |

FIG. 2 shows a device for anchoring of the ADSS cable 1 on the pole of a high voltage line. It consists of a so-called protective spiral 8 with a multitude of metallic wires surrounding the cable jacket in a helical way, the anchoring spiral 10, also metallic and changing at the pole side into a tube-like projection 9, as well as a grommet 11, holding the tube-like projection 9 and fastened to the pole and therefore located on a mass. A grounded shrinkable tube 12, serving as field control, decreases voltage surges in the area of the transition from the aerial cable 1 to the anchoring spiral 10 and thus avoids corona discharges. The shrinkable tube 12, preferably made of a semiconductor polyolefin compound is coated with a conducting melt glue layer towards the cable. The thickness of this layer towards the cable is measured in such a way, that the melt glue, which is warmed and liquified during application of the shrinkable tube 12, seeps into the spaces between the shrinkable tube 12, the protective spiral 8 and the ADSS cable 1 and completely fills them. The shrinkable tube 12 or a shrinkable sleeve which can also be used extend over the end of the protective spiral 8 and surround the ADSS cable 1 along a length of at least 5–100 cm. In order to facilitate the draining of the induced charges from the fusible fibers 7, 7' to the anchoring spiral 10, the conductivity of the cable jacket 6 can be improved by a higher percentage of carbon black.

The cross-section of the ADSS cable 1 shown in FIG. 3 is in essence only different from the above described aerial cable in the construction of its core. The core consists of a central element 13 (perhaps a jacketed rod made of glass fiber reinforced plastic), several optical fiber loose tube or bundle cores 14 stranded onto it (jacket material PBTP) with N=1 (loose tube; outer diameter Ø=1.4 mm) or N=2–12, respectively (bundle core; outer diameter Ø=1.6–3.5 mm), embedded in a thixotropic mass, single- or multimode optical fibers 15 and a carbon black inner jacket 16 or a core webbing, respectively. The aramid yarns, absorbing the tensile forces, are designated with 5, 5', the MDPE outer jacket with 6, and the fusible fibers, embedded during coextrusion into the jacket material and containing carbon or carbon black, are designated with 7, 7'.

FIG. 4 shows an ADL cable 21 according to the invention in cross-section. It consists of the maxibundle core 2 already mentioned, the two tensile discharge elements 17, 17 (aramid yarns) arranged opposite each other and a PE outer jacket 18 with the fusible fibers 19, 19' embedded in the jacketing material and containing carbon. Further construction characteristics and mechanical data for the ADL cable 21 are given in Table 2.

TABLE 2

(ADL Cable)

| | |
|---|---|
| Number of optical fibers | 12–48 |
| Cable diameter | 5.9–6.5 mm |
| Cable weight | 27–34 kg/km |
| Max. tensile load | 100 N |
| Min. bending radius | 130 mm |

The invention is certainly not limited to the above described construction samples. The following refinements or further developments are possible:

- to fabricate the outer jacket of the cable not from PE (HDPE, MDPE, LDPE, LLDPE), but from polypropylene (PP), copolymers of propylene with another olefin or ethylene—vinyl acetate (EVA),
- to embed the semiconductor fusible fibers helically along the cable axis into the cable jacket,
- to use the PE compound LE 0563 from Borealis Deutschland GmbH for the material of the semiconductor fusible fibers,
- to fabricate the semiconductor fusible fibers from PP containing 10–40% of weight in carbon or carbon black,
- to provide several layers of semiconductor fusible fibers in the outer jacket, in a concentric arrangement relative to the longitudinal axis of the cable,
- to strand the optical fibers within the bundle cores,
- to arrange optical fiber ribbons, i.e., several, especially up to 16 optical fibers or optical fiber ribbons, in a parallel arrangement and held together by a mechanical covering, in a stack in the filled or unfilled bundle cores,
- to strand several layers of bundles or loose tubes onto the central element, and
- to provide a central element in the cable core with several slots, open to the outside, located around it in a spiral or helix manner ("slotted core cable").

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An aerial cable comprising:
    a core comprising at least one optical transmission element and a protective covering surrounding said at least one optical transmission element;
    at least one tensile discharge element extending lengthwise along said core;
    a jacket surrounding said core; and
    a plurality of fiber-like elements completely embedded in the jacket, wherein the fiber-like elements consist of a polymer having semiconductor characteristics, and wherein the fiber-like elements have a resistance in a range of $10^5$ Ω/m to $10^9$ Ω/m.

2. An aerial cable according to claim 1 wherein said fiber-like elements include at least one of carbon and carbon black.

3. An aerial cable according to claim 1 wherein said fiber-like elements include 10% to 40% by weight of at least one of carbon and carbon black.

4. An aerial cable according to claim 1 wherein the polymer of said fiber-like elements is a polymer compound having semiconductor characteristics.

5. An aerial cable according to claim 1 wherein the polymer of said fiber-like elements includes a material selected from the group consisting of polyethylene and polypropylene.

6. An aerial cable according to claim 5 wherein said fiber-like elements include at least 50% by weight of the material selected from the group consisting of polyethylene and polypropylene.

7. An aerial cable according to claim 1 wherein said fiber-like elements include polyorganosiloxane.

8. An aerial cable according to claim 1 wherein said fiber-like elements include an antioxidant.

9. An aerial cable according to claim 1 wherein said core defines a longitudinal axis, and wherein said fiber-like elements are parallel and are arranged in a symmetrical manner in relation to the longitudinal axis.

10. An aerial cable according to claim 1 wherein said fiber-like elements are disposed in a helical manner.

11. An aerial cable according to claim 1 wherein said fiber-like elements are arranged in a plurality of layers.

12. An aerial cable according to claim 1 wherein said fiber-like elements are arranged radially in center of said jacket.

13. An aerial cable according to claim 1 wherein said fiber-like elements have a diameter in a range of 0.01 mm to 1 mm.

14. An aerial cable according to claim 1 wherein said plurality of fiber-like elements comprises a number N of fiber-like elements in a range of N=1 to N=100.

15. An aerial cable according to claim 1 wherein said jacket is formed of a material selected from the group consisting of a polyolefin and a copolymer of a plurality of olefins.

16. An aerial cable according to claim 15 wherein said jacket is formed of a material selected from the group consisting of HDPE, MDPE, LDPE, LLDPE or EVA.

17. An aerial cable according to claim 1 wherein said at least one optical transmission element has excess length relative to the length of the aerial cable.

18. An aerial cable according to claim 1 wherein said core further comprises a gel-like substance filling said protective covering and having thixotropic characteristics.

19. An aerial cable according to claim 1 wherein said core defines a longitudinal axis, and wherein said at least one tension discharge element comprises a plurality of tension discharge elements arranged between said protective coating and said jacket in a symmetric manner in relation to the longitudinal axis.

20. An aerial cable comprising:
    a core comprising at least one optical transmission element and a protective covering surrounding said at least one optical transmission element;
    at least one tensile discharge element extending lengthwise along said core;
    a jacket surrounding said core; and a plurality of fiber-like elements having a diameter in a range of 0.01 mm to 1 mm and completely embedded in the jacket, wherein the fiber-like elements consist of a polymer comprising at least 50% by weight of at least one of polyethylene and polypropylene and 10% to 40% by weight of at least one of carbon and carbon black such that the polymer has semiconductor characteristics, and wherein the fiber-like elements have a resistance in a range of $10^5$ $\Omega$/m to $10^9$ $\Omega$/m.

21. An aerial cable according to claim 20 wherein said fiber-like elements include polyorganosiloxane.

22. An aerial cable according to claim 20 wherein said fiber-like elements include an antioxidant.

23. An aerial cable according to claim 20 wherein said core defines a longitudinal axis, and wherein said fiber-like elements are parallel and are arranged in a symmetrical manner in relation to the longitudinal axis.

24. An aerial cable according to claim 20 wherein said fiber-like elements are disposed in a helical manner.

25. An aerial cable according to claim 20 wherein said fiber-like elements are arranged in a plurality of layers.

26. An aerial cable according to claim 20 wherein said fiber-like elements are arranged radially in center of said jacket.

27. A method for manufacturing an aerial cable comprising:
   providing a core comprising at least one optical transmission element and a protective covering surrounding the at least one optical transmission element;
   extruding a jacket about the core; and
   coextruding a plurality of fiber-like elements along with the jacket such that the plurality of fiber-like elements are completely embedded in the jacket, wherein coextruding the plurality of fiber-like elements comprises coextruding a plurality of fiber-like elements consisting of a polymer having semiconductor characteristics with a resistance in a range of $10^5$ $\Omega$/m to $10^9$ $\Omega$/m.

28. A method according to claim 27 further comprising extending at least one tensile discharge element lengthwise along the core and thereafter extruding the jacket about the core and the at least one tensile discharge element.

* * * * *